(12) United States Patent
Hooker

(10) Patent No.: US 7,080,210 B2
(45) Date of Patent: *Jul. 18, 2006

(54) MICROPROCESSOR APPARATUS AND METHOD FOR EXCLUSIVE PREFETCH OF A CACHE LINE FROM MEMORY

(75) Inventor: Rodney Hooker, Austin, TX (US)

(73) Assignee: IP-First, LLC, Fremont, CA (US)

( * ) Notice: Subject to any disclaimer, the term of this patent is extended or adjusted under 35 U.S.C. 154(b) by 264 days.

This patent is subject to a terminal disclaimer.

(21) Appl. No.: 10/364,911

(22) Filed: Feb. 11, 2003

(65) Prior Publication Data
US 2003/0177315 A1    Sep. 18, 2003

Related U.S. Application Data

(60) Provisional application No. 60/356,417, filed on Feb. 12, 2002.

(51) Int. Cl.
G06F 13/00 (2006.01)
(52) U.S. Cl. ............... 711/137; 711/141; 711/144; 711/145
(58) Field of Classification Search ............... 711/137, 711/144, 145, 141
See application file for complete search history.

(56) References Cited

U.S. PATENT DOCUMENTS

| | | |
|---|---|---|
| 4,959,777 A | 9/1990 | Holman, Jr. |
| 5,742,785 A | 4/1998 | Stone et al. |
| 5,903,911 A | 5/1999 | Gaskins |
| 5,944,815 A | 8/1999 | Witt |
| 5,966,734 A | 10/1999 | Mohamed et al. |
| 6,018,763 A | 1/2000 | Hughes et al. |
| 6,088,789 A | 7/2000 | Witt |
| 6,253,306 B1 * | 6/2001 | Ben-Meir et al. ............ 712/207 |

(Continued)

FOREIGN PATENT DOCUMENTS

EP    0489556 A2    6/1992

(Continued)

OTHER PUBLICATIONS

Tullsen et al: "Effective Cache Prefetching on Bus Based Multiprocessors," ACM Transactions on Computer Systems, Association for Computing Machinery. New York, US, vol. 13, No. 1, Feb. 1, 1995, pp. 57-88.

(Continued)

*Primary Examiner*—Reba I. Elmore
(74) *Attorney, Agent, or Firm*—Richard K. Huffman; James W. Huffman

(57) ABSTRACT

A microprocessor apparatus that enables exclusive prefetch of a cache line from memory. The apparatus includes translation logic and execution logic. The translation logic translates an extended prefetch instruction into a micro instruction sequence that directs a microprocessor to prefetch a cache line in an exclusive state, where the extended prefetch instruction is encoded to direct the microprocessor to prefetch the cache line in the exclusive state. The execution logic is coupled to the translation logic. The execution logic receives the micro instruction sequence, and issues a transaction over a memory bus that requests the cache line in the exclusive state, where the cache line comprises a data entity that is to be subsequently modified, and where prefetching the cache line in the exclusive state occurs in parallel with execution of program instructions prior to execution of a subsequent store instruction that directs the microprocessor to modify the data entity.

23 Claims, 11 Drawing Sheets

U.S. PATENT DOCUMENTS

| | | |
|---|---|---|
| 6,460,132 B1 | 10/2002 | Miller |
| 6,470,444 B1 | 10/2002 | Sheaffer |
| 2001/0014932 A1 | 8/2001 | Suganuma |
| 2001/0021963 A1 | 9/2001 | Cypher |
| 2001/0037419 A1 | 11/2001 | Hagersten |
| 2001/0037434 A1 | 11/2001 | Hughes et al. |
| 2002/0007443 A1 | 1/2002 | Gharachorloo et al. |
| 2002/0035675 A1 | 3/2002 | Freersken et al. |
| 2002/0141152 A1 | 10/2002 | Pokharna |
| 2003/0131218 A1 | 7/2003 | Mayfield et al. |
| 2003/0188129 A1 | 10/2003 | Henry et al. |

FOREIGN PATENT DOCUMENTS

| | | |
|---|---|---|
| EP | 0825538 A1 | 2/1998 |
| EP | 0947919 A2 | 10/1999 |
| EP | 1353267 A2 | 10/2003 |

OTHER PUBLICATIONS

Mowry et al: "Tolerating Latency Through Software-Controlled Prefetching in Shared-Memory Mulitiprocessors," Journal of Parallel and Distributed Computing, Academic Press, Duluth, MN, US, vol. 12, No. 2, Jun.1, 1991, pp. 87-106.

Milenkovic, A: "Achieving High Performance in Bus-Based Shared-Memory Multiprocessors," IEEE Concurrency, IEEE Service Center, Piscataway, NY, US, vol, 8, No. 3, Jul. 2000, pp. 36-44.

Todd Mowry. "Tolerating Latency Through Software-Controlled Data Prefetching." May 1994, pp. l-lv and pp. 174-175.

* cited by examiner

Fig. 2 [Prior Art]
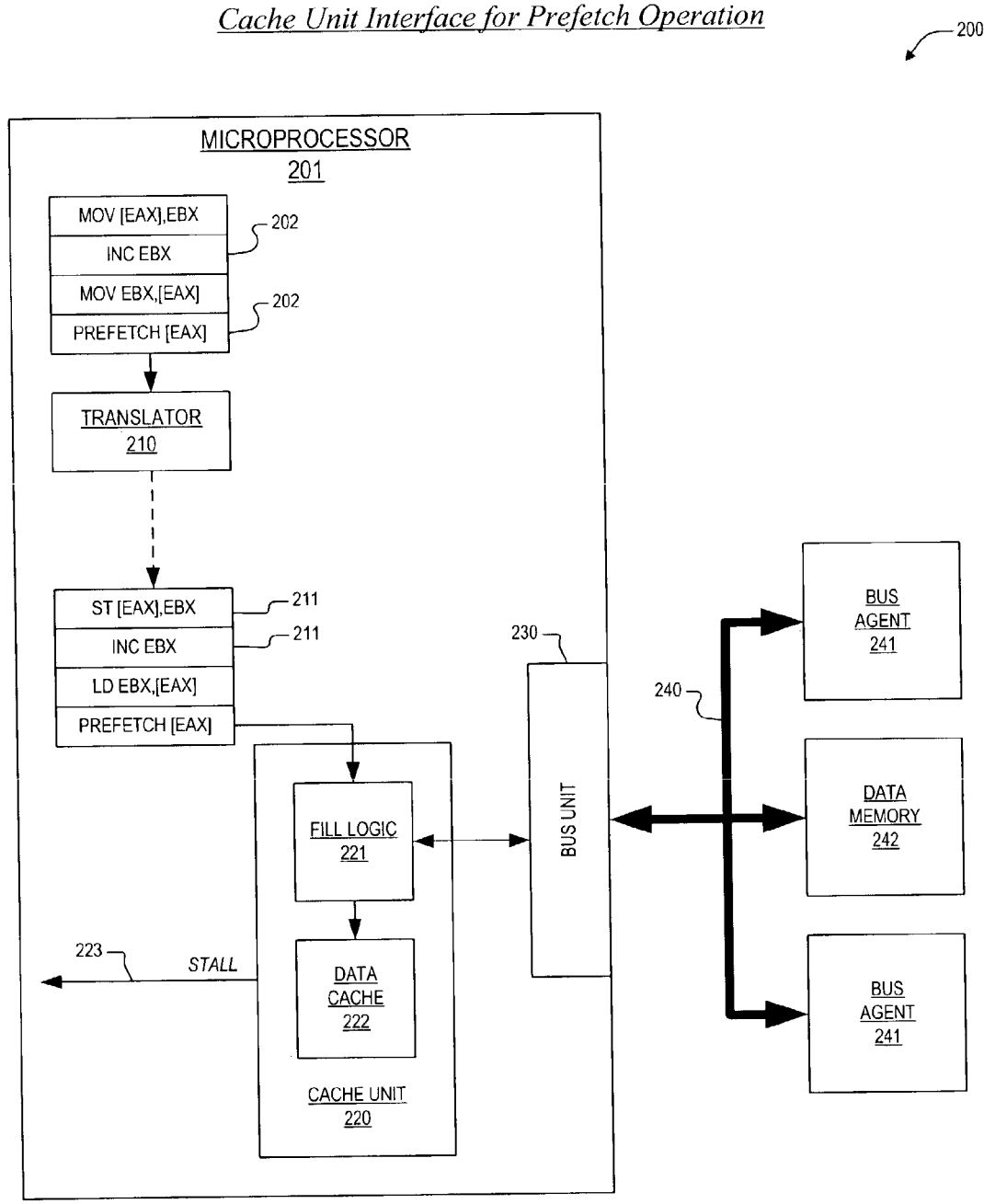

Bus Transactions for Store Operation - Exclusive Prefetch Response

Bus Transactions for Store Operation - Shared Prefetch Response

Fig. 4

*Extended Prefetch Macro Instruction*

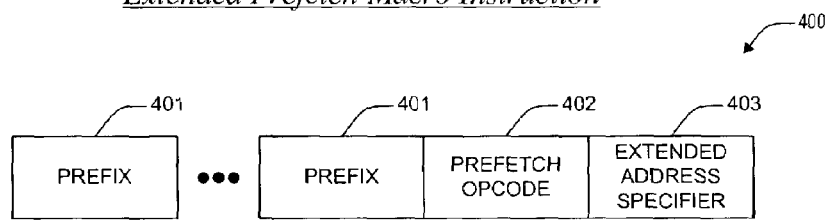

Fig. 5

*Encoding for Extended Address Specifier*

| BITS 5:3 | OPERATION | DESCRIPTION |
|---|---|---|
| 000 | PREFETCHNTA | PREFETCH SPECIFIED DATA USING NTA HINT |
| 001 | PREFETCHT0 | PREFETCH SPECIFIED DATA USING T0 HINT |
| 010 | PREFETCHT1 | PREFETCH SPECIFIED DATA USING T1 HINT |
| 011 | PREFETCHT2 | PREFETCH SPECIFIED DATA USING T2 HINT |
| 100 | PREFETCH.S | PREFETCH SPECIFIED DATA USING S HINT |
| 101 | ILLEGAL | ILLEGAL OPCODE |
| 110 | ILLEGAL | ILLEGAL OPCODE |
| 111 | ILLEGAL | ILLEGAL OPCODE |

Microprocessor for Prefetch With Intent to Store Operation

Cache Unit Interface for Prefetch with Intent to Store Operation

*Bus Transactions for Prefetch with Intent to Store Operation*

*Extended Block Prefetch Macro Instruction*

Cache Unit Interface for Block Prefetch and Store Operation

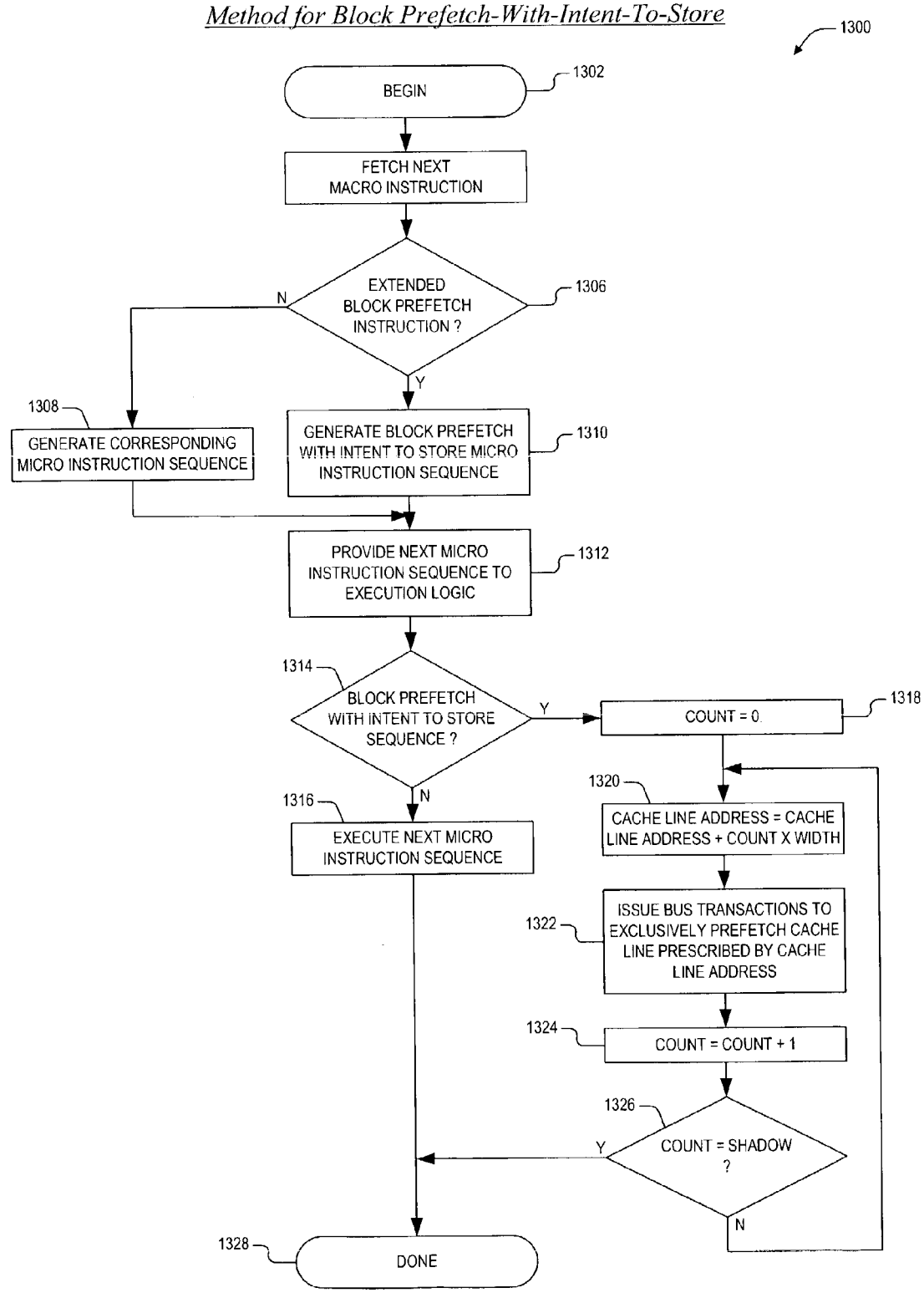

MICROPROCESSOR APPARATUS AND METHOD FOR EXCLUSIVE PREFETCH OF A CACHE LINE FROM MEMORY

CROSS-REFERENCE TO RELATED APPLICATIONS

This application claims the benefit of U.S. Provisional Application Ser. No. 60/356,417 filed on Feb. 12, 2002.

This application is related to the following co-pending U.S. Patent Applications, which are filed on the same day as this application, and which have a common assignee and common inventors.

| SERIAL NUMBER | DOCKET NUMBER | TITLE |
| --- | --- | --- |
| 10/364919 | CNTR. 2182 | PREFETCH WITH INTENT TO STORE MECHANISM FOR BLOCK MEMORY |
| 10/364920 | CNTR. 2162 | APPARATUS AND METHOD FOR ALLOCATION AND INITIALIZATION OF A CACHE LINE |
| 10/364927 | CNTR. 2183 | CACHE DATA BLOCK ALLOCATION AND INITIALIZATION MECHANISM |

BACKGROUND OF THE INVENTION

1. Field of the Invention

This invention relates in general to the field of microelectronics, and more particularly to an apparatus and method that enable a programmer to direct a microprocessor to prefetch a cache line into its internal cache in an exclusive MESI state.

2. Description of the Related Art

In a present day microprocessor, the speed at which data can be transferred between internal logic blocks is an order of magnitude faster than the speed that external memory accesses exhibit. In an x86 desktop computer configuration, the bus which interfaces to system memory operates on the order of hundreds of megahertz while internal microprocessor clock speeds are approaching the tens of gigahertz. Consequently, a hierarchy of cache structures has evolved over more recent years to allow high-performance microprocessors to run at speed without having to execute transactions over a slow memory bus every time data is to be read or written.

An on-board, or local, cache in a pipeline microprocessor is a stand-alone unit in nature that operates in a manner that is transparent to the flow of instructions in the microprocessor pipeline to ensure that data which is going to be required by instructions in an application program is resident within the cache and can hence be accessed at pipeline speeds rather than at memory bus speeds. Cache architectures are varied in the art, some consisting of multiple levels of cache: a first level cache very near to a processor's execution logic, a second level cache which may be on-chip or off chip where less frequently accessed data are stored, third-level caches which may be on a memory card itself, and so on. Regardless of whichever architecture is employed, one skilled in the art will appreciate that the overall objective of a cache is to preclude the case where instructions in a microprocessor pipeline are stalled while a bus transaction over a slow memory bus is issued in order to obtain data that is needed by a pending read or write operation. When this happens, program execution comes to a grinding halt until the data arrives.

To complicate matters, present day computer systems also share regions of memory between devices. For instance, a primary microprocessor communicates with a communications microprocessor by reading data from and writing data to a specified region of memory. It is also very common to find areas of memory known as video buffers that are shared between a primary microprocessor and a microprocessor on a video card that is responsible for displaying data to an operator on a video device.

In an shared memory system, the possibility exists that data from a shared region can be in the local caches of two different microprocessors or other devices connected to a memory bus. And as long as all of the devices do nothing more than read the data, then no harm is done by allowing both of them to have the data in their local cache structures. But unpredictable consequences could result if they were both allowed to modify the data that is locally cached.

To prevent this from happening, system designers have developed cache consistency protocols that indicate that status of data in a cache. The most prevalent protocol is known as Modified, Exclusive, Shared, Invalid ("MESI"). Maintaining a local cache according to MESI ensures that two copies of the same data cannot be modified at the same time. A MESI shared state indicates to a local cache whether or not a particular block of data is shared. If it is shared, then the local processor cannot modify it without first conducting transactions over the slower memory bus to obtain exclusive permission to modify the data. To modify data, a processor must first obtain exclusive ownership of the data.

The problem addressed by the invention described herein relates to the delay that is incurred in a program where it is desired to write data to memory. One skilled in the art will appreciate that a cache has no reasonable way of knowing when a particular area of memory will first be required, and so memory bus delays are always incurred when the particular area of memory is first loaded into local cache. Recognizing this fact, designers have developed a prefetch instruction that can be programmed for execution by a microprocessor. The prefetch instruction, however, does not operate on operands in the program flow. Rather, the prefetch instruction is directs a local cache to load operands from memory into the cache that will be used in the future. And since cache units operate with memory in a manner that is transparent to instruction flow in a microprocessor pipeline, it is prudent to issue a prefetch instruction prior to needing data so that the cache can fetch the data from memory prior to the time it is needed-in parallel with the execution of other instructions in the primary program flow. Then when a subsequent instruction comes along that needs access to the prefetched data, it is readily accessible from cache and program execution is not stalled while waiting for it to be fetched from memory. Prefetched data is readily accessible in cache, that is, so long as it is going to be read. If it is to be modified by a subsequent instruction, then the program execution may have to be delayed while a cache unit goes to the bus to request exclusive ownership of shared data so that it can be modified by the local processor.

Therefore, what is needed is an apparatus and method that enable a programmer to direct a microprocessor to prefetch data in a state where it can be modified by a subsequent operation without having to resort to bus transactions to obtain exclusive ownership of the data.

SUMMARY OF THE INVENTION

The present invention, among other applications, is directed to solving these and other problems and disadvantages of the prior art. The present invention provides a superior technique for prefetching cache data in a state where a subsequent store operation can be posted without incurring memory bus delay to perfect exclusive ownership of the cache data. In one embodiment, a microprocessor apparatus is provided that enables exclusive prefetch of a cache line from memory. The apparatus includes translation logic and execution logic. The translation logic translates an extended prefetch instruction into a micro instruction sequence that directs a microprocessor to prefetch a cache line in an exclusive state, where the extended prefetch instruction is encoded to direct the microprocessor to prefetch the cache line in the exclusive state. The execution logic is coupled to the translation logic. The execution logic receives the micro instruction sequence, and issues a transaction over a memory bus that requests the cache line in the exclusive state, where the cache line comprises a data entity that is to be subsequently modified, and where prefetching the cache line in the exclusive state occurs in parallel with execution of program instructions prior to execution of subsequent store instruction that directs the microprocessor to modify the data entity.

One aspect of the present invention contemplates a microprocessor for performing a prefetch with intent to store operation. The microprocessor has an extended prefetch instruction that is configured to direct the microprocessor to prefetch a cache line in an exclusive state. The microprocessor also has a translator that is configured to receive the extended prefetch instruction, and to translate the extended prefetch instruction into associated micro instructions, where the extended prefetch instruction is encoded to direct the microprocessor to prefetch the cache line in the exclusive state;. The associated micro instructions direct execution logic within the microprocessor to issue a bus transaction over a memory bus that requests exclusive ownership of the cache line, where the cache line comprises a data entity that is to be subsequently modified, and where prefetching the cache line in the exclusive state occurs in parallel with execution of program instructions prior to execution of a subsequent store instruction that directs the microprocessor to modify the data entity.

Another aspect of the present invention comprehends a method for prefetching a cache line in an exclusive state. The method includes retrieving an extended prefetch macro instruction, where the extended prefetch instruction is encoded to direct a microprocessor to prefetch the cache line in the exclusive state; translating the extended prefetch macro instruction into a micro instruction sequence, the micro instruction sequence directing the microprocessor to prefetch the cache line in the exclusive state; and responsive to the micro instruction sequence, issuing a bus transaction over a memory bus to read the cache line in the exclusive state. The issuing includes allowing the microprocessor to execute following instructions in parallel with the issuing.

BRIEF DESCRIPTION OF THE DRAWINGS

These and other objects, features, and advantages of the present invention will become better understood with regard to the following description, and accompanying drawings where:

FIG. 2 is a block diagram depicting a cache unit interface to memory for performing a prefetch operation within the microprocessor of FIG. 1;

FIG. 3A illustrates transactions for a store operation with an exclusive prefetch response. FIG. 3B illustrates transactions for a store operation with a shared prefetch response.

FIG. 4 is a block diagram showing an extended prefetch instruction according to the present invention;

FIG. 5 is a table illustrating how an extended address specifier field within the extended prefetch instruction of FIG. 4 is encoded to direct a microprocessor to prefetch a cache line in an exclusive MESI state;

FIG. 13 is a flow chart illustrating a method according to the present invention for performing a block prefetch with intent to store operation.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
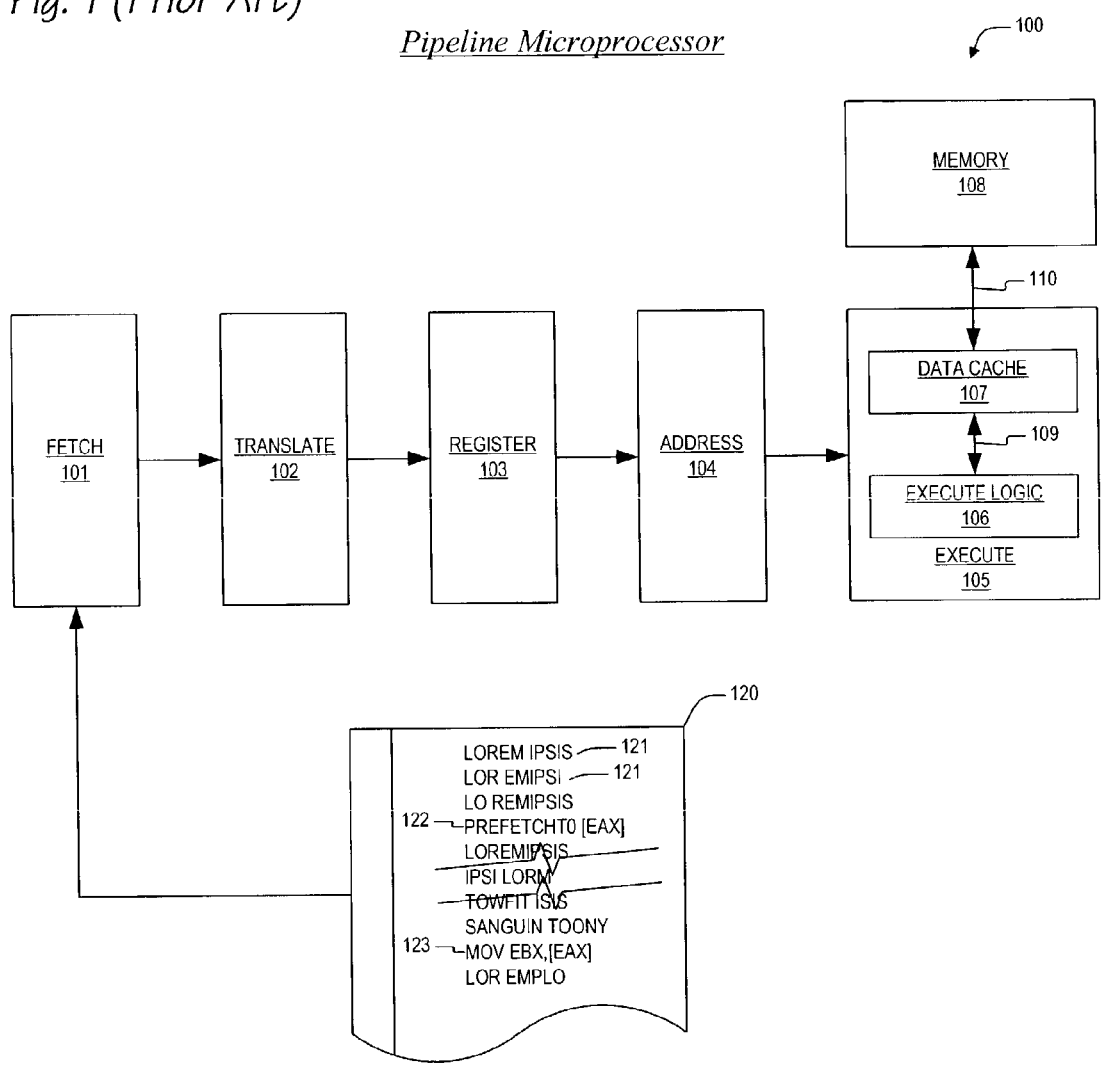
FIG. 1 is a block diagram illustrating significant pipeline stages in a present day microprocessor.

In view of the above background discussion on how a present day pipeline microprocessor executes a prefetch operation, an example highlighting the limitations of present day prefetch techniques will now be presented with reference to FIGS. 1–3. Following this, a discussion of the present invention will be presented with reference to FIGS. 4–13. The present invention enables a programmer to direct a microprocessor to prefetch data into its cache in an exclusive MESI state, thereby precluding any program delay that may result when a subsequent store instruction is executed to modify the data.

Turning now to FIG. 1, a block diagram is presented illustrating significant pipeline stages 101–105 in a present day pipeline microprocessor 100. The microprocessor 100 has a fetch stage 101, a translate stage 102, a register stage 103, an address stage 104, and an execute stage 105.

In operation, the fetch stage 101 retrieves macro instructions 121–123 from an instruction area 120 of system memory for execution by the microprocessor 100. The macro instructions 121–123 are provided to the translate stage 102. The translate stage 102 translates the macro instructions 121–123 into corresponding sequences of micro (or native) instructions (not shown) that direct the microprocessor 100 to perform operations which are specified by the macro instructions 121–123. The micro instructions proceed through subsequent stages 103–105 of the pipeline in synchronization with a pipeline clock signal (not shown), very similar to the manner in which work products proceed through successive stations in an assembly line. Accordingly, micro instructions are provided to the register stage 103. If a particular micro instruction specifies an operand that is stored within a register in the register stage 103, then logic therein accesses the register to retrieve the operand and the operand is forwarded along with the particular micro instruction to the address stage 104. The address stage 104 contains logic to generate addresses used to access operands that are stored in data memory 108. Like the register stage 103, the address stage 104 forwards generated addresses along with their corresponding micro instructions to the execute stage 105.

The execute stage 105 performs the operations that are specified by the micro instructions. In a present day microprocessor 100, the types of operations vary according to instruction set architecture, however one skilled in the art will appreciate that these operations fall into general computation categories such as logical operations, arithmetic operations, and memory access operations (i.e., data read and data write operations). Results generated by performing the prescribed operations are either stored back into registers in the register stage 103 or they are written to locations in data memory 108.

One skilled in the art will appreciate that a modern pipeline microprocessor 100 may have many more stages than those 101–105 shown in FIG. 1 because increasing the number of stages in a pipeline by decomposing major functions within the pipeline is a proven technique for increasing the throughput of instructions 121–123 through the pipeline. For clarity purposes however, the pipeline stages 101–105 of the present day microprocessor 100 shown in FIG. 1 present major groupings of functions to illustratively teach shortcomings of the prior art without burdening the reader with irrelevant details.

It is notable that a present day microprocessor 100 provides a data cache 107 within the execute stage 105 along with execute logic 106. The data cache 107 operates in parallel to the execution of instructions in the pipeline stages 101–105 to ensure that data which has a high probability of being accessed by the instructions 121–123 of an application program are present within the cache 107 so that when a data access micro instruction (i.e., a load memory or store memory micro instruction) proceeds through the execute stage 105, the execute logic 106 is able to execute the data access in one or two pipeline clock cycles rather than incurring a program delay of perhaps hundreds of clock cycles while waiting for the data access to be executed to system data memory 108 over a memory bus 110. In an efficient cache system configuration, data load and store operations occur predominately between the execute logic 106 and the data cache 107 over a cache bus 109, and the data cache 107 operates in a manner that is relatively transparent to the flow of micro instructions through the pipeline stages 102 105 to ensure that cached copies of data entities are synchronized and consistent with system memory 108.

The prevailing protocol for ensuring the consistency of cache entries in a system configuration that shares regions of memory 108 is known as MESI (modified, exclusive, shared, invalid). Although not depicted in FIG. 1, other devices (not shown) in a computing system configuration may share certain areas of memory 108 for the purposes of operating on the same data. For example, a video card may share a region of memory 108 with the microprocessor 100 to enable access of data for display on a monitor which has been generated by the microprocessor 100. In another example, multiple devices on the system bus 110 may communicate among themselves by writing data to and reading data from shared areas of data memory 108. It is beyond the scope of the present application to provide a detailed description of the architectural considerations that provide the motivation for use of the MESI protocol; it is sufficient herein to observe that the MESI prevails in the art for ensuring data consistency between system memory 108 and local cache structures 107.

Because transactions over the memory bus 110 take hundreds of clock cycles to complete, data is transferred to and from the data cache 107 in blocks consisting of a number of bytes. These blocks are called cache lines. Although cache line widths (i.e., the size of a cache line in bytes) can vary according to architecture, it is not uncommon today to find system configurations that exhibit 32-byte line widths, or 64-byte line widths, or even 128-byte line widths.

Even the most efficient cache structures 107 must incur delay to initially transfer data from memory 108 to cache 107 over the memory bus 110. But once a cache line has been provided to the cache 107, subsequent accesses to data entities within the cache line can be accomplished without incurring significant delay because the speed of a cache 107 and the cache bus 109 is commensurate with the speed of other logic within the microprocessor 100, say, the execute logic 106.

According to MESI, a cache line within a local data cache 107 may be in one of four states: modified, exclusive, shared, and invalid. A modified line is one to which a local store operation has been executed, but which has not yet been synchronized with main memory 108. It is the responsibility of a local cache 107 to monitor memory transactions over the memory bus 110 from other devices (also known as bus agents) so that if they request data from a modified cache line, the local cache 107 provides the modified data to the requesting bus agent. This monitoring of the bus 110 is known as bus snooping. A cache line in the exclusive state is one to which the local cache 107 may execute a store operation. The exclusive state implies that the local cache 107 possesses exclusive ownership of the cache line; the microprocessor 100 is thus allowed modify its contents. A shared cache line is one that is resident within the local caches 107 of two or more devices on the bus 110. As such, each device may read data from a shared cache line, but they are not allowed to modify its contents. In order to modify data (i.e., execute a store operation) in a shared cache line, a device 100 must first conduct appropriate transactions over the memory bus 110 to obtain exclusive ownership of the cache line (i.e., to read the cache line into its cache 107 in the exclusive MESI state) prior to modifying its contents. Once exclusive ownership of the line is obtained, then the store operation may be executed and the cache line state changes to modified. Requiring exclusive ownership of a cache line before posting store operations guarantees data consistency in that only one device 100 can modify the contents of a cache line at any point in time. A cache line's state is changed to invalid when the local cache 107 detects (by snooping) a write transaction over the memory bus 110 to that cache line, or when a bus transaction is issued over the bus 110 by another device to obtain exclusive ownership of the line. Marking a line as invalid indicates that the data within is not to be read or written because it is most likely inconsistent with memory 108.

Because a data cache 107 operates in parallel with the flow of instructions through a microprocessor pipeline, designers have provided prefetch macro instructions 122 to load data into a cache 107 before access to the data is required in a program flow 120, thereby overcoming the delay that is incurred when data must initially be retrieved from memory 108 into the cache 107. A prefetch instruction 122 is generally provided in a program flow 120 to direct the local data cache 107 to load a cache line from memory 108 in parallel with the execution of subsequent instructions so that the cache line will be in the cache 107 at the point in the program flow 120 where an instruction 123 accesses data from within the cache line. In the example of FIG. 1, a prefetch instruction 122, PREFETCHTO [EAX], directs that the cache line addressed by the contents of register EAX be loaded into cache 107 so that its contents will be available when a subsequent data access instruction 123, MOV EBX, [EAX], is executed in the program flow 120 that directs the microprocessor 100 to read data from an address prescribed by register EAX and move it to register EBX. The prefetch instruction 122 and move instruction 123 within the program flow 120 are depicted according to the x86 instruction set architecture conventions for clarity sake in that x86 instructions are widely recognized. One skilled in the art will appreciate, however, that many other instruction set architectures provide prefetch instructions 122 that direct a microprocessor 100 to read a cache line from memory 108 into a local data cache 107 so that delay is not incurred when a subsequent instruction 123 is executed that prescribes a data read operation from the cache line. If judiciously placed within a program flow 120, prefetch instructions 122 are very efficient for overcoming the delay associated with initially accessing data in a data cache 107 and can thereby provide for substantial increases in program execution speed. When transactions over the memory bus 110 for the prefetch operation are completed, the requested cache line is present in cache 107 in either an exclusive state (if the local cache 107 has the only copy of the cache line) or a shared state (if another device also has a cached copy of the requested line). In either state, data entities within the cached line are available for immediate read access. But as alluded to above, in order to write data to a cache line (i.e., to perform a store operation), exclusive ownership of the line is required. Consequently, if the prefetch operation resulted in caching the line in an exclusive state, then a pending store may be immediately posted to the line. But if the line was provided from the bus 110 in a shared state, then a pending store must be stalled while the cache unit 107 issues transactions over the bus 110 to perfect exclusive ownership of the line. After the line is provided to the cache 107 in the exclusive state, then the pending store can be posted.

Now referring to FIG. 2, a block diagram 200 is provided depicting a cache unit interface to memory for performing a prefetch operation within the microprocessor of FIG. 1. The block diagram 200 shows logic within the microprocessor 201 that is employed to perform the prefetch operation. The microprocessor 201 has a translator 210 that receives a flow of macro instructions 202 and translates the macro instructions 202 into associated micro instructions 211. Micro instructions 211 that direct data load and store operations from and to memory 242 are subsequently provided to a cache unit 220. The cache unit 220 includes fill logic 221 and a data cache 222. The fill logic 221 is coupled to a bus unit 230. The bus unit 230 interfaces to a system memory bus 240, to which the data memory 242 and other bus agents 241 are coupled.

An exemplary flow of macro instructions 202 illustrates how a prefetch operation is prescribed and how subsequent read and store operations may be conducted on the prefetched data. A common example of this sequence of operations on a desktop computer is where a counter in memory is read and incremented. A sequence of prefetch, read, and store operations recognizes a need to both read data and to subsequently modify data within a cache line. Accordingly, a first macro instruction 202 in the exemplary flow directs the microprocessor 201 to prefetch the cache line whose address corresponds to the contents of register EAX. A second macro instruction, MOV EBX, [EAX], directs the microprocessor 201 to read the contents of a memory location whose address is prescribed by register EAX and write the contents in register EBX. A third macro instruction, INC EBX, directs the microprocessor 201 to increment the contents of register EBX. A fourth macro instruction, MOV [EAX], EBX directs the microprocessor 201 to store the contents of register EBX in a memory location corresponding to the contents of register EAX. The above-detailed prefetch, read, and store operations merely increment a value in memory whose address is provided by EAX. It is noted that to effectively employ the prefetch instruction 202 would require that it 202 be provided sufficiently in advance of the second macro instruction 202, MOV EBX, [EAX], so that the delay associated with loading the cache line prescribed by the contents of EAX could be absorbed by parallel execution of intervening macro instructions 202. For clarity sake, however, the intervening instructions are not depicted in the block diagram 200.

The translator 210 translates the prefetch macro instruction 202 into a corresponding prefetch micro instruction 211, which is provided to the cache unit 220. The fill logic 221 queries the data cache 222 to determine if the requested line is already resident and valid (i.e., not in an invalid state) within the data cache 222. If not, then the fill logic 221 directs the bus unit 230 to issue transactions over the system memory bus 240 to obtain the requested cache line from memory 242. If no other bus agent 241 has a copy of the requested line, then the fill logic provides the requested line to the data cache 222 in the exclusive state. If one or more of the bus agents 241 have a local copy of the requested line, then the fill logic 221 writes the line to cache 222 as shared. In either state, the requested line is resident in the cache 222 for following access operations.

The translator 210 translates the second macro instruction 202 into a load micro instruction 211, LD EBX, [EAX], directing the microprocessor to load the contents of the memory address prescribed by register EAX into register EBX. As discussed with reference to FIG. 1, execute logic (not shown) within the microprocessor 201 requests contents of the memory address from the cache unit 220. Because the cache line containing the contents is already resident in the data cache 222 as a result of the prefetch operation, it is immediately available and the load micro instruction 211 is executed without delay.

The third macro instruction 202 is translated into a corresponding increment micro instruction 211, INC EBX, that directs execute logic to increment the contents of register EBX. Since no new data is required, the load micro instruction 211 is not provided to the cache unit 220.

Finally, the fourth macro instruction 202 in the flow is translated into a store micro instruction 211, ST [EAX], EBX, that directs the execute logic to perform a data store operation to write the contents of register EBX into the memory location addressed by the contents of register EAX. The store micro instruction 211 is thus provided to the cache unit 220 as a pending store operation. Accordingly, the fill logic 221 detects that the cache line targeted for the pending store operation is present in the data cache 222. If the cache line is in the exclusive state, then the pending store may be immediately posted and the line's state is changed to modified. If, on the other hand, the cache line is shared, then the cache unit 220 asserts a stall signal 223 to halt the progression of micro instructions 211 through the pipeline stages of the microprocessor 201 while the fill logic 221 directs the bus unit 230 to conduct transactions over the system bus 240 to obtain exclusive ownership of the cache line. Once exclusive ownership is obtained, the pending store is allowed to post its data to the cache line and the stall signal is terminated, thereby allowing program execution to resume.

Consider now a type of operation where data is simply going to be written to memory without a requirement to first read the data, or a type of operation where data is to be read, but it is positively contemplated that a store will be subsequently posted. In these cases, program delay can be minimized with certainty by executing a prior prefetch instruction only for the case where data is to be read first. And in this case, if a requested cache line is provided exclusively as a result of the prefetch, then program delay associated with the store operation is precluded. But if the cache line is provided in a shared state as a result of the prefetch, then delay associated with the store operation is incurred in either case. This is a problem because present day instruction set architectures do not provide a way to direct a microprocessor 201 exclusively fetch a cache line into data cache 222. Although cache lines can be provided in response to a prefetch operation as exclusive, such a state cannot be guaranteed. This is because prefetch macro instructions 202 architecturally presume that prefetched data is to be read, and the resulting transactions over the system bus 240 request that the cache line be fetched regardless of whether it is shared or not. For example, in the x86 architecture, the transaction issued over the memory bus 240 as a result of execution of an x86 prefetch instruction is a data read operation. The data read operation requests a copy of a cache line without regard to its state.

Figure 3A:
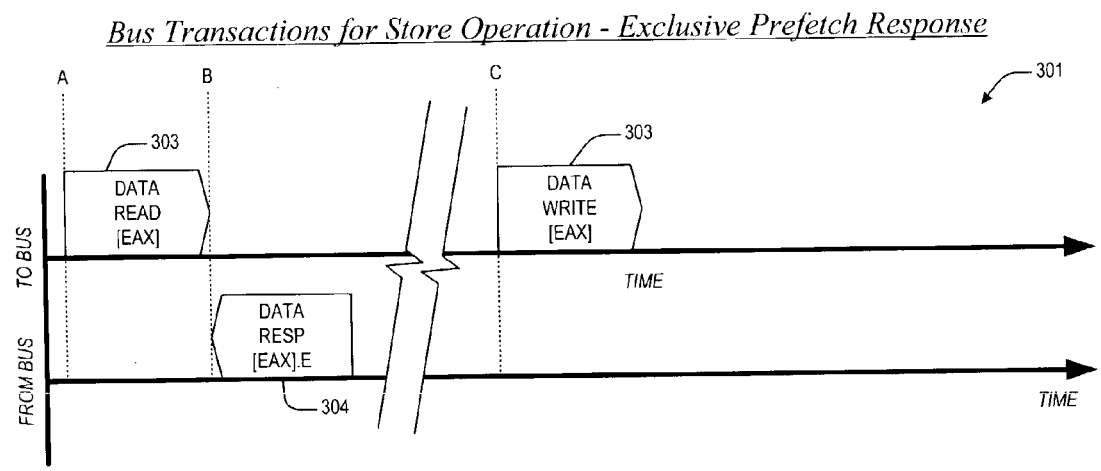
FIGS. 3A and 3B are timing diagram timing diagrams illustrating two possible sets of transactions that are issued over a memory bus by the microprocessor of FIGS. 1 and 2 to perform the prefetch operation.
Figure 3B:
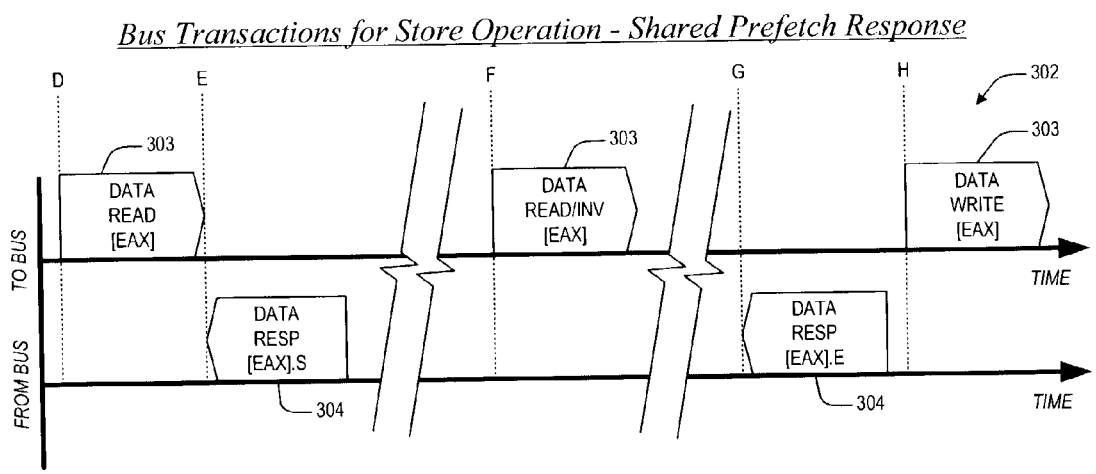

Now turning to FIGS. 3A and 3B, timing diagrams are presented illustrating two possible sets 301, 302 of bus transactions which are issued over a memory bus 240 by the microprocessor 201 of FIGS. 1 and 2 to perform a prefetch and subsequent store operation. The two sets 301, 302 of transactions include request transactions 303 from the bus unit 230 to the memory bus 240 and response transactions 304 from the memory bus 240 back to the bus unit 230 within the microprocessor 201. Transaction set 301 depicts those transactions 303–304 that are conducted when a requested cache line is provided exclusively as a response to a prefetch operation; transaction set 302 depicts those transactions 303–304 that are conducted when the requested line is provided in a shared MESI state in response to the prefetch. As described above with reference to FIG. 2, when a prefetch instruction is executed, the fill logic 221 directs the bus unit 230 to issue a data read request 303, DATA READ [EAX], to the memory bus 240 requesting that the cache line prescribed by register EAX be provided to the local cache 222. The data read request 303 is issued at time A in set 301 and time D in set 302. In response, the memory bus 240 sends a data response 304 back to the bus unit 230 that includes the requested cache line, If the cache line is provided exclusively, ten the data response 304, DATA RESP [EAX].E, of set 301 is sent back at time B to the bus unit 230. If the cache line is shared, then the data response 304, DATA RESP [EAX].S, of set 302 is sent back at time E to the bus unit 230. At this point, the data can be read from cache 222 without incurring bus transaction delay.

When a subsequent store operation to the provided cache line is encountered, then the scenario of transaction set 302 illustrates what transactions 303, 304 must occur in order to post the store operation. In transaction set 301, since the cache line was initially provided as exclusive, then all that is required to post the store is to issue a data write transaction 303, DATA WRITE [EAX], at time C over the bus 240 to write the data to memory 242. But as transaction set 302 illustrates, before a data write 303 can be issued at time H, transactions 303, 304 at times F and G must first be conducted to raise the ownership status of the cache line from shared to exclusive. At time F, a data read and invalidate request 303, DATA READ/INV [EAX], is sent by the bus unit 230 requesting exclusive ownership of the shared cache line. And hundreds of cycles later at time G, a response 304, DATA RESP [EAX].E, is received from the bus 240 upgrading the state of the cache line to exclusive. After the response 304 is received at time G, then the data write 303 can be posted to the bus 240 at time H.

It is noted tat the transaction sets 301, 302 depicted in FIGS. 3A and 3B are presented in generic terms because different microprocessor architectures employ different semantics to illustrate bus transactions 303, 304. In addition, it is noted that all of the transactions to first gain access to the data bus 240 (e.g., BUS REQUEST, BUS GRANT, etc.) have been omitted from the timing diagrams of FIGS. 3A and 3B for clarity purposes.

The present inventors have observed that present data prefetch instructions are limited in that they do not support positively contemplated store operations where it is advantageous to prefetch a cache line into cache 222 with the express intent of executing a store to the cache line—a prefetch with intent to store operation—regardless of whether contents of the cache line are read prior to posting a store to the cache line. If one observes the transactions 303, 304 of set 302, it is evident that prefetching a cache line in the shared state is only useful when that line is going to be read prior to posting a store to it. If a store is going to be posted to the line, then program execution must be delayed while the state of the line is upgraded from shared to exclusive.

Programmers recognize the limitations of present day prefetch instructions, yet they employ them in prefetch with intent to store situations because it is possible (although perhaps not probable) to obtain exclusive ownership of a cache line in response to a data read request simply because no other bus agent possesses a copy of the requested line. But it is more desirable, however, to circumvent the possibility of prefetching a cache line in a shared state and to direct a microprocessor 201 to prefetch a cache line in the exclusive state. The present invention is directed toward an apparatus and method for prefetching a single cache line and a plurality of cache lines in the exclusive MESI state so that program delay associated with subsequent store operations is precluded altogether. The present invention is now discussed with reference to FIGS. 4–13.

Turning to FIG. 4, a block diagram is presented showing an extended prefetch instruction 400 according to the present invention. The extended prefetch instruction 400 includes an optional plurality of prefix entities 401, followed by a prefetch opcode 402, which is followed by an extended address specifier 403. In one embodiment, each of prefix and extended address entities 401, 403 are 8-bits in size and the prefetch opcode entity 402 is one or two bytes in size and all entities 401–403 conform to the x86 instruction set architecture except as modified herein.

Operationally, the prefetch opcode 402 is a specific opcode value that directs a conforming microprocessor to perform a prefetch operation. In an x86 embodiment, the specify value of the opcode entity 401 is 0F18h. One or more optional prefix entities 401 may be employed to direct a conforming microprocessor to force certain types of additional operations such as repeating the operation for a number of times defined by a counter (e.g., in x86 architecture, the REP prefix), forcing an atomic operation (e.g., in x86 architecture, a LOCK prefix), etc. The extended address specifier 403 is employed to specify the specific type of prefetch operation that is to be executed. In an x86 embodiment, the extended address specifier 403 is also known as the ModR/M byte 403.

When a prefetch macro instruction 400 is detected by a microprocessor according to the present invention, the microprocessor is directed to prefetch data into cache from memory according to hint values as specified by contents of the extended address specifier 403, an example of which will now be discussed with reference to FIG. 5.

FIG. 5 is a table 500 illustrating how an extended address specifier field 403 within the extended prefetch instruction 400 of FIG. 4 is encoded to direct a microprocessor according to the present invention to prefetch a cache line in an exclusive MESI state. For the purposes of teaching the present invention, ModR/M bit fields conforming to the x86 architecture are employed, however, it is contemplated that the present invention comprehends any architecture providing the means whereby a prefetch-exclusive hint may be encoded into an instruction 400. Although the example of FIG. 5 is directed toward encoding the prefetch-exclusive (or prefetch with intent to store) hint into an extended address specifier 403, one skilled in the art will appreciate that the prefetch hint could as well be encoded as a specific opcode value in an opcode field 401.

In the exemplary encoding, an x86 ModR/M byte encodes the type of prefetch operation prescribed by a prefetch opcode 401 in bits 5:3 of the ModR/M byte. Presently, the x86 prefetch instruction allows values 000, 001, 010, and 011 to prescribe prefetch hints that are intended for read operations. All four values 000–011 direct an x86 microprocessor to prefetch data into its caches with varying degrees of closeness. For example, a T0 hint (i.e., value 001), directs the microprocessor to prefetch a cache line into all levels of cache hierarchy, while an NTA hint directs the microprocessor to prefetch a cache line into a non-temporal cache structure and into a location close to the processor, while minimizing cache pollution. But the common feature of the x86 prefetch hints encoded as 000–011 is that a data read request is issued over the bus that requests a copy of a cache line regardless of its MESI state. The present invention encodes an additional hint in the extended address specifier that directs a microprocessor according to the present invention to prefetch a prescribed cache line using an exclusive (.S) hint. FIG. 5 shows the prefetch-exclusive hint encoding as value 100 in bits 5:3 of an x86 ModR/M byte. When the prefetch.s hint is encoded in a prefetch instruction according to the present invention, a conforming microprocessor is directed to issue transactions over a memory bus to prefetch data in the exclusive MESI state. In an x86 embodiment, the specific transaction that is issued responsive to a prefetch.s hint in the prefetch instruction is a data read and invalidate transaction, such as has been previously described with reference to FIG. 3B. The data read and invalidate transaction was required to raise the state of a shared cache line to the exclusive state.

In the x86 instruction set architecture, encoding of bits 5:3 as 100 has heretofore been declared illegal, as is shown in the table 500 for values 101–111. An illegal ModR/M byte encoding results in an exception. But in an x86 embodiment according to the present invention, the additional encoding to perfect a prefetch-exclusive hint is considered legal and will result in the aforementioned bus transactions to prefetch a cache line in the exclusive state.

It is acknowledged that since the interaction of cache structures with memory is removed from the flow of instructions through a microprocessor pipeline, the prefetch instruction 400 can only request that prefetching be performed according to the hints provided. If a cache is not presently occupied with memory accesses, then prefetch operations are executed. But if a cache is otherwise busy, prefetch operations are deferred.

Figure 6:
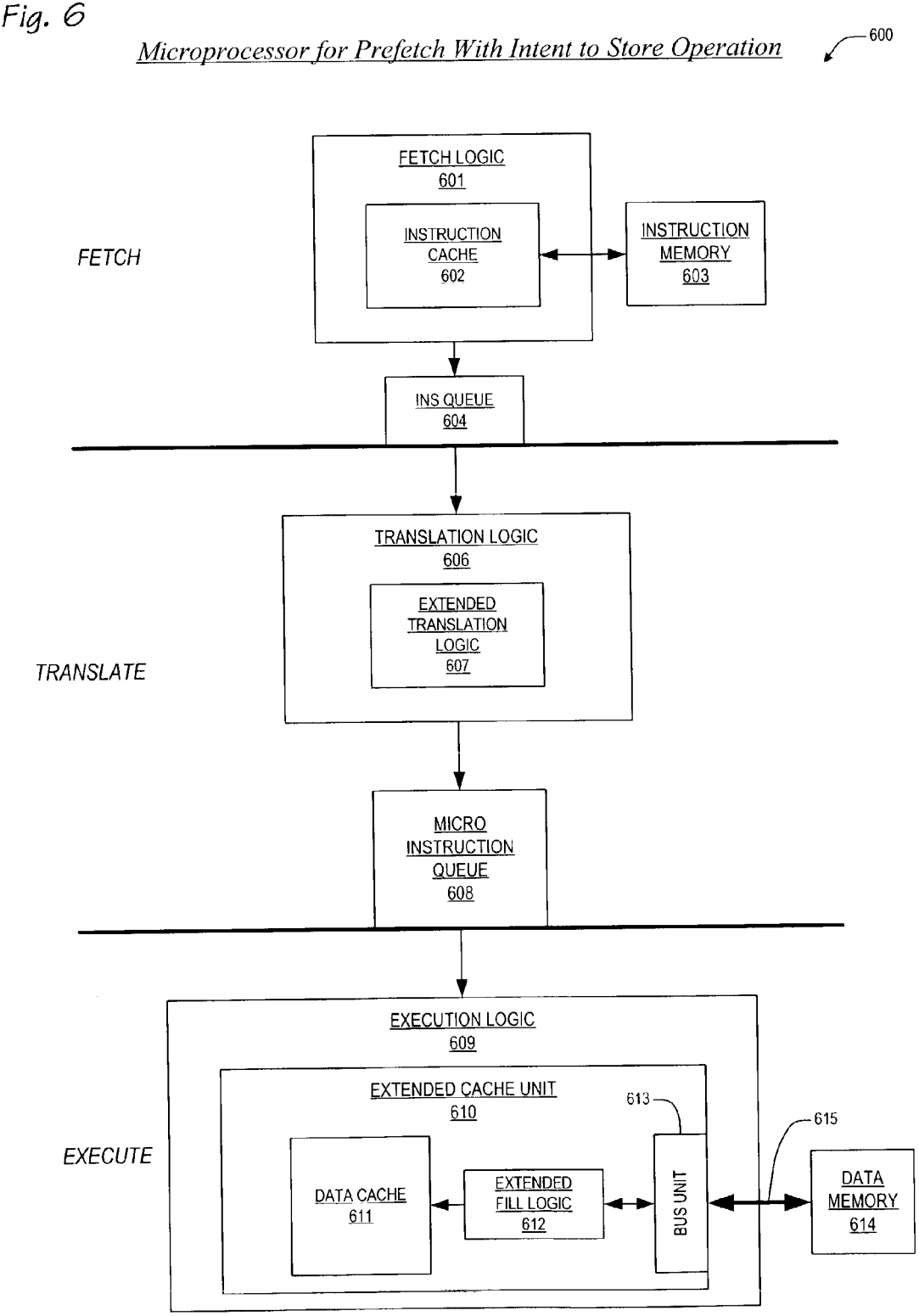
FIG. 6 is a block diagram detailing a microprocessor according to the present invention for performing a prefetch with intent to store operation.

Now referring to FIG. 6, a block diagram is presented detailing a microprocessor 600 according to the present invention for performing a prefetch with intent to store operation. The microprocessor 600 has three notable stage categories: fetch, translate, and execute. The fetch stage has fetch logic 601 that retrieves macro instructions into an instruction cache 602 from an instruction memory 603. The retrieved macro instructions are provided to the translate stage via an instruction queue 604. The translate stage has translation logic 606 that is coupled to a micro instruction queue 608. The translation logic 606 includes extended translation logic 607. The execute stage has execution logic 609 that includes an extended cache unit 610. The extended cache unit 610 has a data cache 611, that is coupled to extended fill logic 612. The extended fill logic 612 is coupled to a bus unit 613. The bus unit 613 is coupled to a data memory 614.

In operation, the fetch logic 601 retrieves formatted instructions according to the present invention into the instruction cache 602 from the instruction memory 603, and provides the macro instructions in the instruction queue 604 in execution order. The macro instructions are retrieved from the instruction queue 604 in order and are provided to the translation logic 606. The translation logic 606 translates each of the provided macro instructions into a corresponding micro instruction sequence that directs the microprocessor 600 to perform the operations prescribed by the macro instructions. The extended translation logic 607 detects extended prefetch macro instructions according to the present invention and also provides for translation of corresponding extended prefixes and address specifier entities. In an x86 embodiment, the extended translation logic 607 is configured to detect an x86 prefetch instruction and to translate the ModR/M byte of the x86 prefetch instruction according to the conventions described with reference to FIGS. 4–5 into a prefetch micro instruction sequence directing the microprocessor 600 to exclusively prefetch a cache line into data cache 611.

The micro instructions are routed from the micro instruction queue 608 to the execution logic 609, wherein the extended cache unit 610 is configured to execute an exclusive prefetch operation according to the present invention. When a prefetch micro instruction sequence is executed by the execution logic 609, the extended fill logic 612 directs the bus unit 613 to issue transactions over a memory bus 615 to the data memory 614 requesting that a prescribed cache line be prefetched into the data cache 611 in the exclusive MESI state.

One skilled in the art will appreciate that the microprocessor 600 described with reference to FIG. 6 is a simplified representation of a pipeline microprocessor 600 according to the present invention. In fact, as alluded to above, today's pipeline microprocessor architectures comprise many pipeline stages. However, these stages can be generally categorized into the three stage groups shown in the block diagram and thus, the block diagram of FIG. 6 serves to teach the essential elements that are required to implement embodiments of the present invention as described hereinabove. Those elements of a microprocessor 600 which are extraneous to the present discussion, for clarity, are not depicted.

Figure 7:
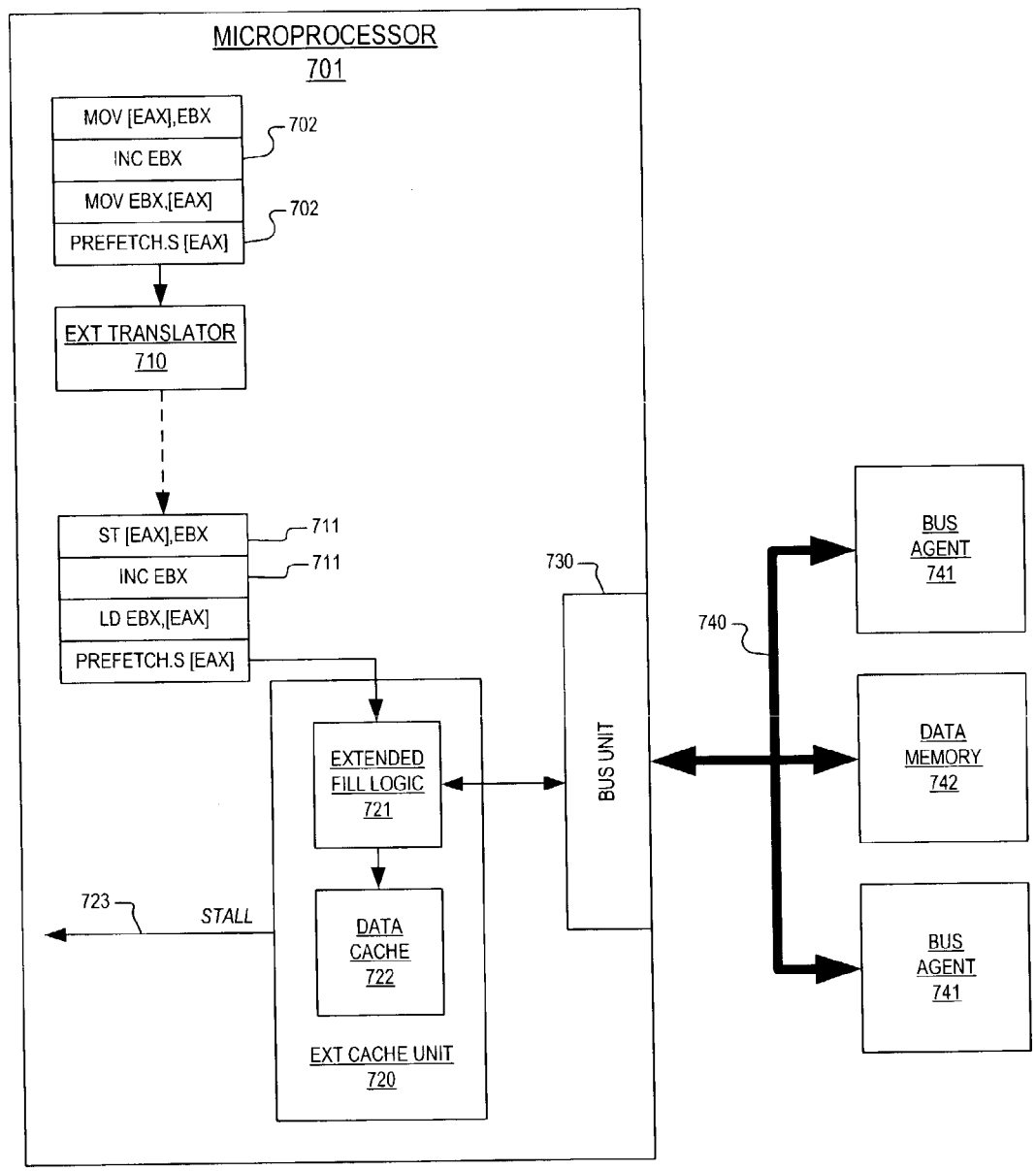
FIG. 7 is a block diagram depicting a cache unit interface to memory for performing a prefetch with intent to store operation within the microprocessor of FIG. 6.

Turning to FIG. 7, a block diagram 700 is presented depicting a cache unit interface to memory for performing a prefetch and store operation within the microprocessor of FIG. 6. The block diagram 700 shows logic within the microprocessor 600 that is employed to perform the prefetch operation. The microprocessor 701 has an extended translator 710 that receives a flow of macro instructions 702 and translates the macro instructions 702 into associated micro instructions 711. Micro instructions 711 that direct data load and store operations from and to memory 742 are subsequently provided to an extended cache unit 720. The extended cache unit 720 includes extended fill logic 721 and a data cache 722. The extended fill logic 721 is coupled to a bus unit 730. The bus unit 730 interfaces to a system memory bus 740, to which the data memory 742 and other bus agents 741 are coupled.

An exemplary flow of macro instructions 702 illustrates how a prefetch operation is prescribed and how subsequent read and store operations are conducted on the prefetched data. As described above with reference to FIG. 2, a common example of this sequence of operations on a desktop computer is where a counter in memory is read and incremented. However, in contrast to the microprocessor 201 of FIGS. 1–2, a microprocessor 701 according to the present invention when directed to exclusively prefetch a cache line is effective in eliminating bus transaction delay that would otherwise be associated with subsequent store instructions, regardless of whether or not prefetched data is to be read by intervening instructions. The example flow of macro instructions 702 presented in FIG. 7 contemplates a data read operation prior to performing a store operation on prefetched data, however, one skilled in the art will appreciate that data can also be prefetched exclusively and subsequently written without an intervening read operation.

Accordingly, an extended prefetch instruction 702, PREFETCH.S [EAX], in the exemplary flow directs the microprocessor 701 to exclusively prefetch the cache line whose address corresponds to the contents of register EAX. A second macro instruction 702, MOV EBX, [EAX], directs the microprocessor 701 to read the contents of a memory location whose address is prescribed by register EAX and write the contents in register EBX. A third macro instruction, INC EBX, directs the microprocessor 701 to increment the contents of register EBX. A fourth macro instruction, MOV [EAX], EBX directs the microprocessor 701 to store the contents of register EBX in a memory location corresponding to the contents of register EAX. It is noted that to effectively employ the exclusive prefetch instruction 702, PREFETCH.S [EAX], would require that it 702 be executed sufficiently in advance of the second macro instruction 702, MOV EBX, [EAX], so that the delay associated with loading the cache line prescribed by the contents of EAX could be absorbed by parallel execution of intervening macro instructions 702. For clarity sake, however, the intervening instructions are not depicted in the block diagram 700.

The translator 710 translates the extended prefetch macro instruction 702 into a corresponding exclusive prefetch micro instruction 711, PREFETCH.S [EAX], which is provided to the extended cache unit 720. The extended fill logic 721 queries the data cache 722 to determine if the requested line is already resident and valid (i.e., not in an invalid state) within the data cache 722. If not, then the extended fill logic 721 directs the bus unit 730 to issue transactions over the system memory bus 740 to obtain the requested cache line from memory 742 in the exclusive MESI state. If no other bus agent 741 has a copy of the requested line, then the extended fill logic 721 provides the requested line to the data cache 722 in the exclusive state. If one of the bus agents 741 has a local copy of the requested line in the exclusive state, then according to the specific bus transaction protocol that is employed, it snoops the transaction on the bus 740 requesting the line and invalidates its local copy. If the local copy has been modified, then the bus agent writes the modified data out to the bus 740 allowing the microprocessor 701 to obtain exclusive ownership of the line. If more than one bus agent 741 shares the line, then they all invalidate their local copies so that the line is provided to the microprocessor 701 in the exclusive state. In either of the cases, the requested line is provided to the cache 722 in the exclusive state and is available for a subsequent store operation.

The translator translates the second macro instruction 702 into a load micro instruction 711, LD EBX, [EAX], directing the microprocessor to load the contents the memory address prescribed by register EAX into register EBX. Because the cache line containing the contents is already resident in the data cache 722 as a result of the prefetch with intent to store operation, it is immediately available and the load micro instruction 711 is executed without delay.

The third macro instruction 702 is translated into a corresponding increment micro instruction 711, INC EBX, that directs execute logic to increment the contents of register EBX. Since no new data is required, the load micro instruction 711 is not provided to the extended cache unit 720.

Finally, the fourth macro instruction 702 in the flow is translated into a store micro instruction 711, ST [EAX], EBX, that directs the execute logic to perform a data store operation to write the contents of register EBX into the memory location addressed by the contents of register EAX. The store micro instruction 711 is thus provided to the extended cache unit 720 as a pending store operation. Accordingly, the fill logic 721 detects that the cache line targeted for the pending store operation is present in the data cache 222 and as a result of the exclusive prefetch, the cache line is in the exclusive state. Consequently, the store can be posted without delay. In contrast to the microprocessor 201 of FIG. 2, the extended cache unit 720 according to the present invention need not assert a stall signal 723 to post the pending store because the target cache line was exclusively prefetched.

Figure 8:
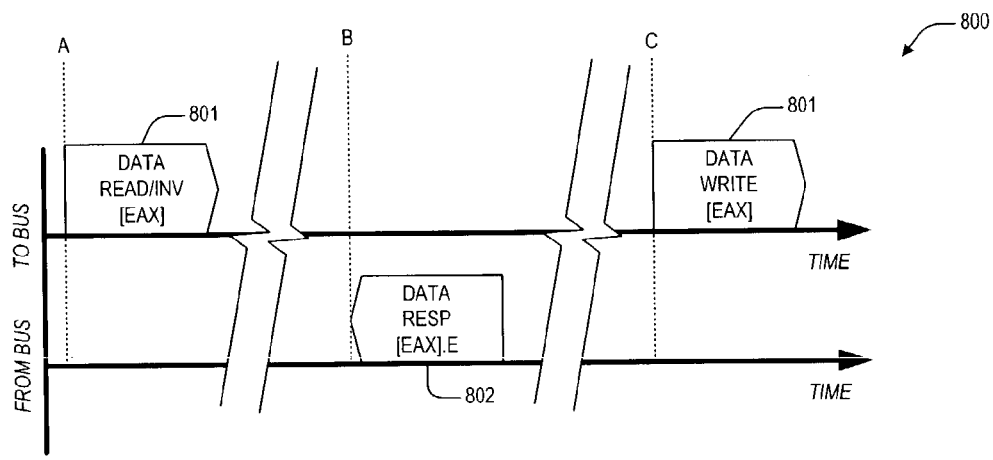
FIG. 8 is a timing diagram illustrating bus transactions that are issued over a memory bus by the microprocessor of FIGS. 6 and 7 to perform the prefetch with intent to store operation according to the present invention.

Now turning to FIG. 8, a timing diagram 800 is presented illustrating bus transactions 801, 802 that are issued over a memory bus 740 by the microprocessor of FIGS. 6 and 7 to perform the prefetch with intent to store operation according to the present invention. The transactions 801, 802 include request transactions 801 from the bus unit 730 to the memory bus 740 and response transactions 802 from the memory bus 740 back to the bus unit 730 within the microprocessor 701. The timing diagram 800 depicts those transactions 801, 802 that are conducted when a cache line is requested and provided exclusively as a response to a prefetch with intent to store operation that is prescribed by a prefetch-exclusive macro instruction according to the present invention. Accordingly, when a prefetch-exclusive instruction is executed, the extended fill logic 721 directs the bus unit 730 to issue a data read and invalidate request 801, DATA READ/INV [EAX], to the memory bus 740 requesting that the cache line prescribed by register EAX be provided to the local cache 722 in the exclusive MESI state. The data read and invalidate request 801 is issued at time A. In response, the memory bus 740 sends a data response 802, DATA RESP [EAX].E, back to the bus unit 230 at time B providing the requested cache line in the exclusive MESI state. At this point, the data can be read from cache 222 or written to by a store operation without incurring bus transaction delay.

As noted with reference to FIG. 3, the transactions 801, 802 depicted in FIG. 8 are presented in generic terms because different microprocessor architectures employ different semantics to illustrate bus transactions 801, 802. The transactions 801, 802 depicted in FIG. 8 roughly follow x86 conventions, but such depiction is only intended to teach the present invention. Such convention is not intended to restrict application of the present invention to a particular instruction set architecture. In addition, it is noted that all of the transactions to first gain access to the data bus 740 (e.g., BUS REQUEST, BUS GRANT, etc.) have been omitted from the timing diagram 800 for clarity purposes.

The present invention not only contemplates exclusive prefetch of a single cache line, but also comprehends those situations where it is desired to modify a block of data. Accordingly, embodiments directed toward exclusively prefetching a block of data will now be discussed with reference to FIGS. 9–11.

Figure 9:
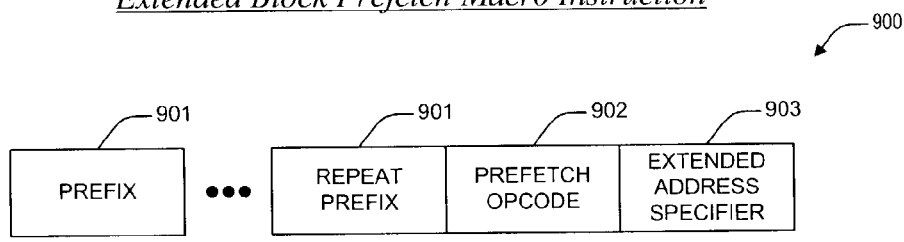
FIG. 9 is a block diagram showing an extended block prefetch instruction according to the present invention.

FIG. 9 is a block diagram showing an extended block prefetch instruction 900 according to the present invention. The extended block prefetch instruction 900 includes an optional plurality of prefix entities 901, one of which is a repeat prefix 901. The prefix entities 901 are followed by a prefetch opcode 902, which is followed by an extended address specifier 903. In one embodiment, each of prefix and extended address entities 901, 903 are 8-bits in size, and the prefetch opcode entity 902 is one or two bytes in size and all entities 901–903 conform to the x86 instruction set architecture except as modified herein. In such an embodiment, the x86 repeat prefix (REP) 901 is employed to indicate a block prefetch operation.

Operationally, the prefetch opcode 902 is a specific opcode value that directs a conforming microprocessor to perform a prefetch operation. In an x86 embodiment, the specify value of the opcode entity 901 is 0F18h. The extended address specifier 903 is employed to specify the specific type of prefetch operation that is to be executed. In an x86 embodiment, the extended address specifier 903 is the ModR/M byte 903.

As described above with reference to FIG. 4, when a prefetch macro instruction 900 is detected by a microprocessor according to the present invention, the microprocessor is directed to prefetch data into cache from memory according to hint values as specified by contents of the extended address specifier 903. The encoding example described with reference to FIG. 5 describes encoding of prefix hints in the block extended address specifier 903 as well. However, if the microprocessor detects a repeat prefix 901 within the extended prefetch instruction 900, then the microprocessor attempts to prefetch a specified number of cache lines into its local cache in the exclusive state, where the number of cache lines is prescribed in an architectural register within the microprocessor. In one embodiment, the number of cache lines is specified within register ECX in an x86-compatible microprocessor.

Figure 10:
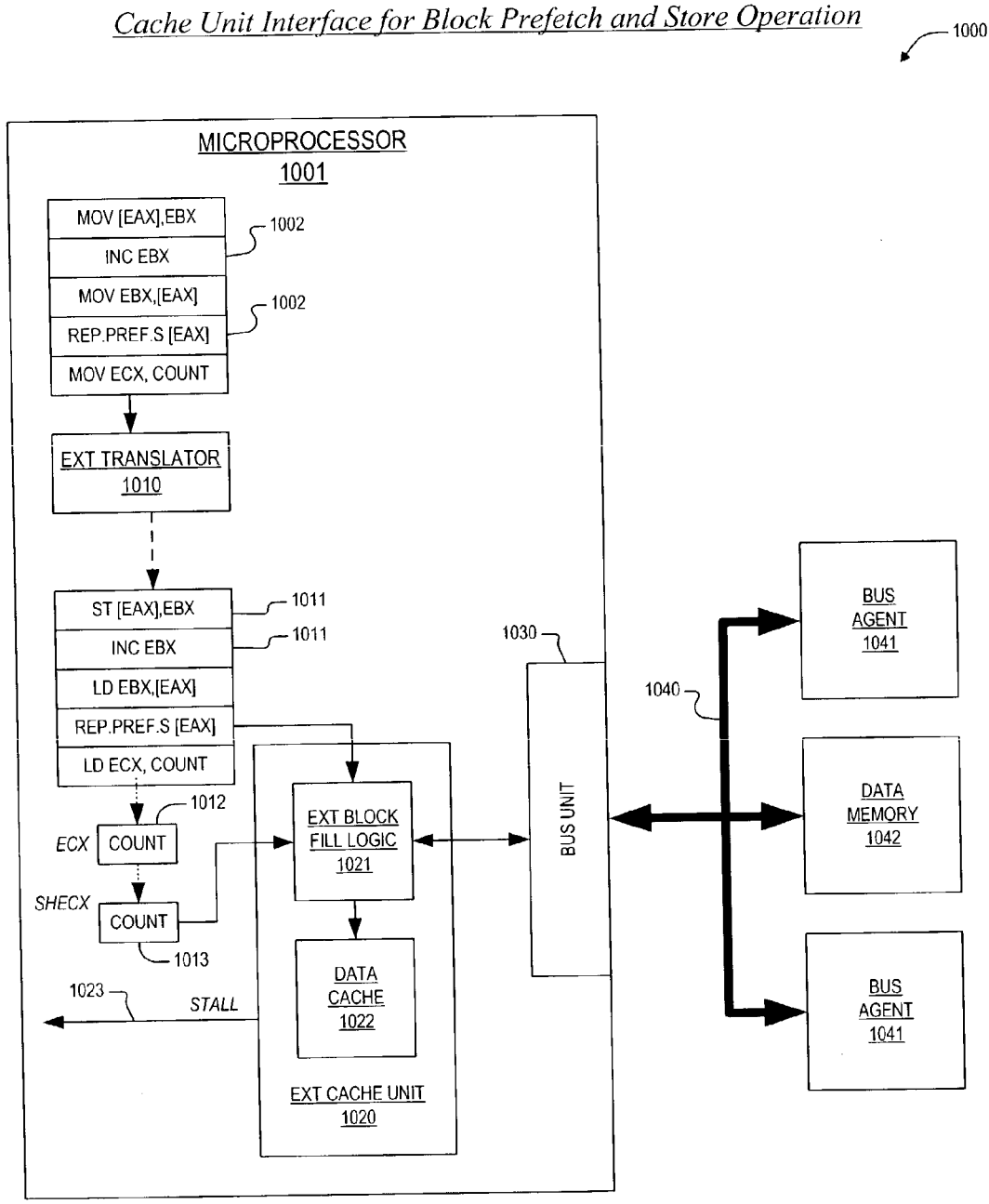
FIG. 10 is a block diagram depicting a cache unit interface to memory for performing a block prefetch and store operation within the microprocessor of FIG. 6.

Referring to FIG. 10, a block diagram 1000 is presented depicting a cache unit interface to memory for performing a block prefetch and store operation within the microprocessor 600 of FIG. 6. Identification and operation of the elements within the microprocessor 1001 of FIG. 10 are similar to those like elements within the microprocessor 701 of FIG. 7, where the hundreds digit is replaced by a 10. To perfect an exclusive block prefetch operation according to the present invention, an extended translator 1010 is enabled to translate an extended prefetch instruction with a repeat prefix 1002 into a micro instruction sequence 1011 directing an exclusive block prefetch operation. In addition, a shadow count register 1013 is provided to which the number of cache lines to be prefetched is loaded from an architectural register 1012. And extended block fill logic 1021 is provided to direct the bus unit 1030 to request exclusive prefetch of the specified block of cache lines, and to provide those lines into the data cache 1022 upon receipt.

To initiate an exclusive block prefetch operation, a first macro instruction 1002, MOV ECX, COUNT, is provided to initialize architectural register ECX with the number of cache lines in the block that are to be prefetched exclusively. The extended translator 1010 translates the first macro instruction into a load micro instruction 1011, LD ECX, COUNT, directing the microprocessor to load the count into ECX. When the count is loaded into ECX, it is also transparently copied into the shadow count register 1013, SHECX. At this point, other instructions 1002 may modify the architectural register 1012 without disturbing the count for the prefetch operation.

Following initialization of the count, an extended block prefetch instruction 1002, REP.PREF.S [EAX], is translated by the extended translator 1010 that directs the microprocessor 1001 to prefetch the number of cache lines prescribed by ECX into local cache in the exclusive state, where the address of the first cache line to be prefetched is prescribed in register EAX. Responsive to a micro instruction sequence 1011 directing the exclusive block prefetch operation, the extended block fill logic 1021 directs the bus unit 1030 to issue bus requests over the memory bus 1040 requesting the cache lines beginning at the address prescribed by EAX in the exclusive state. The fill logic 1021 receives these lines as they arrive and allocates them into the data cache 1022. Once entered into the cache in the exclusive state, any or all of the prefetched cache lines may be modified without incurring additional delay.

Figure 11:
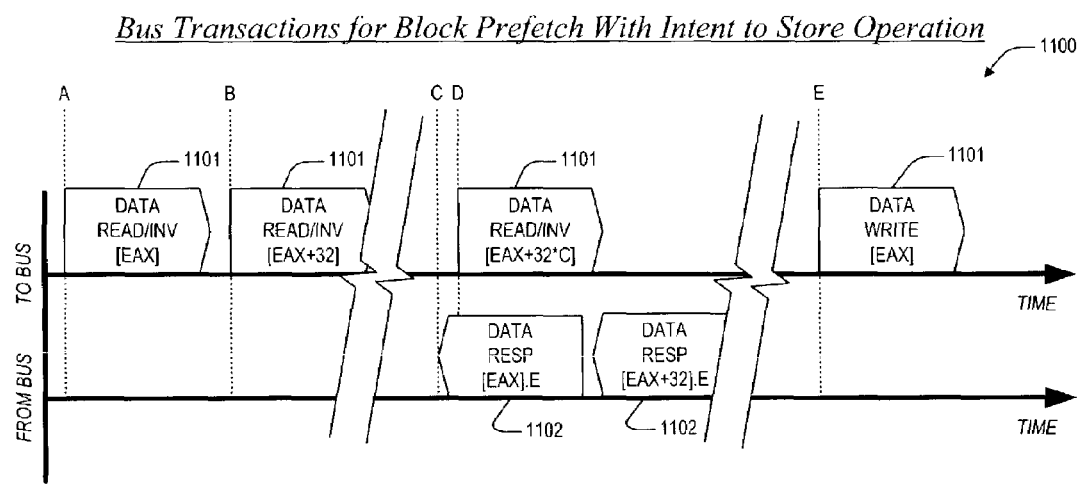
FIG. 11 is a timing diagram illustrating bus transactions that are issued over a memory bus by the microprocessor of FIGS. 6 and 10 to perform the block prefetch and store operation according to the present invention.

Now turning to FIG. 11, a timing diagram 1100 is presented illustrating bus transactions 1101, 1102 that are issued over a memory bus 1040 by the microprocessor 1001 of FIGS. 6 and 10 to perform the block prefetch and store operation according to the present invention. For illustrative purposes, the example of FIG. 11 presumes 32-byte cache lines in a system configuration. One skilled in the art will appreciate from the following example, however, that the present invention comprehends any cache line width that is contemplated in a system configuration. The transactions 1101, 1102 include request transactions 1101 from the bus unit 1030 to the memory bus 1040 and response transactions 1102 from the memory bus 1040 back to the bus unit 1030 within the microprocessor 1001. The timing diagram 1000 depicts those transactions 1001, 1002 that are conducted when a block of cache lines is requested and provided exclusively as a response to a block prefetch with intent to store operation that is prescribed by a prefetch-exclusive macro instruction according to the present invention that includes a repeat prefix. Accordingly, when a block prefetch-exclusive instruction is executed, the extended fill logic 1021 directs the bus unit 1030 to issue a plurality of data read and invalidate requests 1101 that correspond to the number of cache lines specified within the architectural register. The plurality of requests includes the addresses of the all of the cache lines in the cache line block, as initially specified by contents of an architectural register, EAX. Although the bus requests 1101 are provided in ascending address order, it is noted that the present invention comprehends descending order, random ordering, and staggered ordering to accommodate the conventions of different memory bus protocols. A first data read and invalidate request 1101 is issued at time A, a second request 1101 at time B, and so on until a final request 1101 is provided at time D. In many architectures, bus responses 1102 are tagged and consequently, they may begin to arrive at time C prior to completion of the last request. At time C, at least one cache line in the block is available for a pending store. However, to ensure that delay is minimized, it is recommended that store operations to the block of lines be postponed until time E, when all of the responses 1102 have been received in the exclusive state.

In response, the memory bus 740 sends a data response 802, DATA RESP [EAX].E, back to the bus unit 230 at time B providing the requested cache line in the exclusive MESI state. At this point, the data can be read from cache 222 or written to by a store operation without incurring bus transaction delay.

Figure 12:
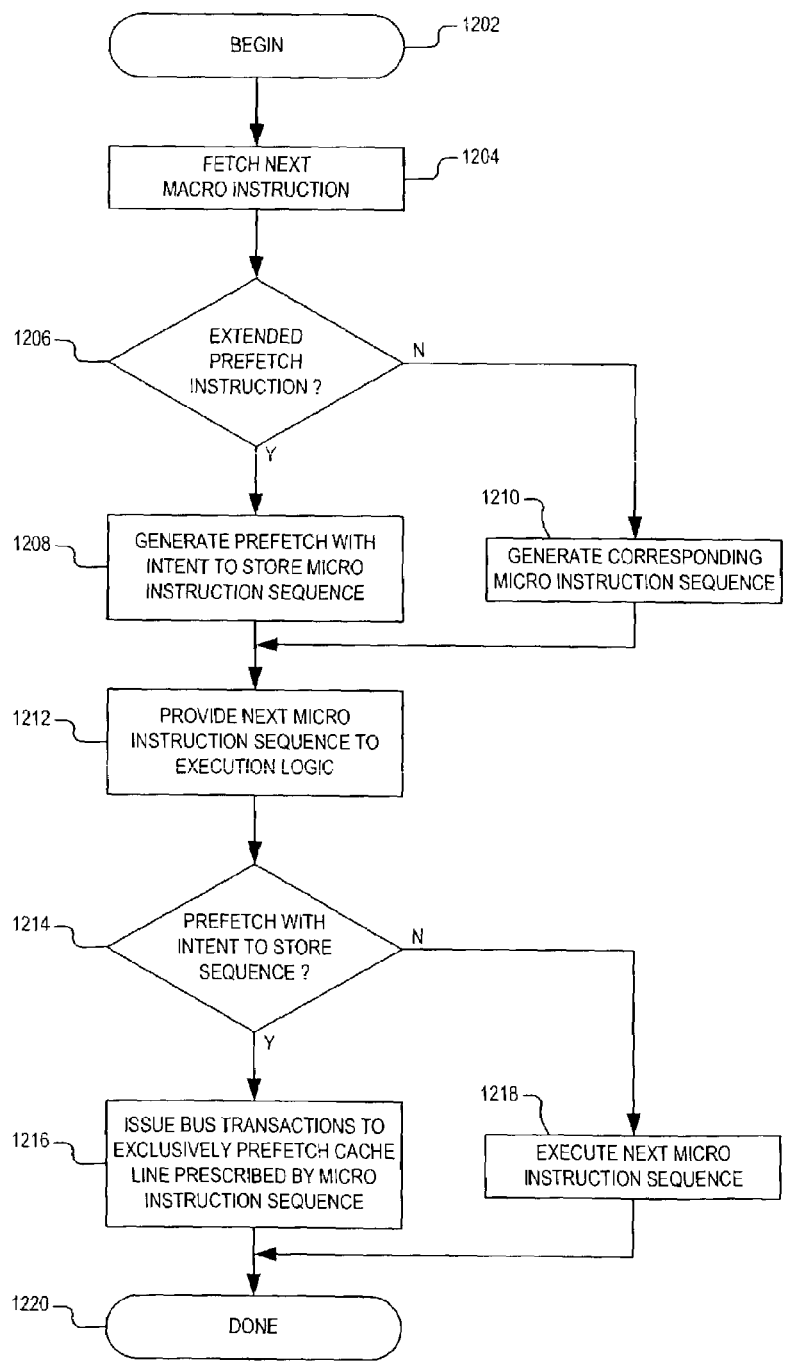
FIG. 12 is a flow chart illustrating a method according to the present invention for performing a prefetch with intent to store operation.

Now referring to FIG. 12, a flow chart 1200 is presented illustrating a method according to the present invention for performing a prefetch with intent to store operation.

Flow begins at block 1202 where a flow of macro instructions is provided to an instruction queue according to the present invention. Flow then proceeds to block 1204.

At block 1204, a next macro instruction is fetched from the instruction queue and provided to an extended translator. Flow then proceeds to decision block 1206.

At decision block 1206, an evaluation is made to determine if the next macro instruction is an extended prefetch instruction. If so, then flow is directed to block 1208. If not, then flow proceeds to block 1210.

At block 1208, a detected extended prefetch instruction is translated into a prefetch with intent to store micro instruction sequence that directs a microprocessor to prefetch a specified cache line in the exclusive state. Flow then proceeds to block 1212.

At block 1210, the macro instruction is translated into a corresponding micro instruction sequence directing the microprocessor to perform a specified operation. Flow then proceeds to b lock 1212.

At block 1212, a next micro instruction sequence is provided to execute logic in the microprocessor. Flow then proceeds to decision block 1214.

At decision block 1214, the next micro instruction sequence is evaluated to determine if it is a prefetch with intent to store sequence. If so, then flow is directed toward block 1216. If not, then flow proceeds to block 1218.

At block 1216, responsive to the prefetch with intent to store sequence, bus transactions are issued to a memory bus requesting exclusive ownership of a prescribed cache line. In response, the cache line is provided to the microprocessor in the exclusive MESI state and is thus available for store operations without incurring bus delay to raise the state of the line so that it can be modified. Flow is then directed to block 1220.

At block 1218, the next micro instruction sequence is executed. Flow then proceeds to block 1220.

At block 1220, the method completes.

Now turning to FIG. 13, a flow chart 1300 is presented illustrating a method according to the present invention for performing a block prefetch with intent to store operation.

Flow begins at block 1302 where a flow of macro instructions is provided to an instruction queue according to the present invention. Flow then proceeds to block 1304.

At block 1304, a next macro instruction is fetched from the instruction queue and provided to an extended translator. Flow then proceeds to decision block 1306.

At decision block 1306, an evaluation is made to determine if the next macro instruction is an extended block prefetch instruction. If so, then flow is directed to block 1310. If not, then flow proceeds to block 1308.

At block 1310, a detected extended block prefetch instruction is translated into a block prefetch with intent to store micro instruction sequence that directs a microprocessor to prefetch a specified number of cache lines in the exclusive state. Flow then proceeds to block 1312.

At block 1308, the macro instruction is translated into a corresponding micro instruction sequence directing the microprocessor to perform a specified operation. Flow then proceeds to b lock 1312.

At block 1312, a next micro instruction sequence is provided to execute logic in the microprocessor. Flow then proceeds to decision block 1314.

At decision block 1314, the next micro instruction sequence is evaluated to determine if it is a prefetch with intent to store sequence. If so, then flow is directed toward block 1318. If not, then flow proceeds to block 1316.

At block 1316, the next micro instruction sequence is executed. Flow then proceeds to block 1328.

At block 1318, responsive to the block prefetch with intent to store sequence, a temporary counter is initialized to zero to monitor the number of bus transactions that will be issued requesting exclusive ownership of a block of cache lines. Flow then proceeds to block 1320.

At block 1320, a first cache line address is prescribed for a first data read and invalidate bus transaction. The first cache line address is derived from an address prescribed by the extended block prefetch instruction, to which is added a cache line width multiplied by the count of block 1318. Since the count is initialized to zero, the first cache line address is equal to that prescribed by the extended block prefetch instruction. Flow then proceeds to block 1322.

At block 1322, a data read and invalidate transaction is issued over the memory bus to prefetch the first cache line in the exclusive MESI state. Flow then proceeds to block 1324.

At block 1324, the count is incremented and flow is directed to decision block 1326.

At decision block 1326, an evaluation is made to determine is the incremented count is equal to the number of cache lines to be prefetched, as stored in a shadow register. If not, flow proceeds to block 1320, where another iteration is executed to fetch a next cache line. If count equals contents of the shadow register, then all bus transaction have been issued and flow is directed to block 1328.

At block 1328, the method completes.

Although the present invention and its objects, features, and advantages have been described in detail, other embodiments are encompassed by the invention as well. For example, the present invention has been characterized herein as providing advantages for pending store operations in accordance with the MESI protocol. MESI has been selected to exemplify the present invention because of its prevalent use in the art. However, it is noted that the present invention provides for prefetching of data into a local cache in such a form, or state, that it can be immediately modified by a pending store operation without a need to issues transactions to a memory bus. Whether that form or state accords with MESI is inconsequential.

As noted earlier, cache line width varies according to architecture. In desktop systems, 32-byte cache lines prevail today. But such representation of the present invention is not intended to restrict its application to 32-, 64-, 128-, or even 256-byte cache lines. On the contrary, it is contemplated that the present invention is applicable to any system architecture that restricts modification of local cache lines and which does not provide for direct prefetch of those lines so that they can be immediately modified without resorting to bus transactions to obtain permission to do so.

Furthermore, the present invention has been illustratively described with reference to embodiments conforming to the x86 architecture. Certainly, x86-compatible microprocessors will benefit from incorporation of the present invention, but it is noted that the scope of the present invention extends beyond the boundaries of the x86-compatible community because many different architectures employ prefetch instructions that do not ensure a return of exclusive data.

Finally, it is noted that although an address specifier is employed herein to specify an address of a cache line to be prefetched, such specification need not be explicit. An embodiment of a prefetch instruction according to the present invention could implicitly specify an architectural register that contains the address, where a prior instruction is executed to load the address into the architectural register.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. A microprocessor apparatus, providing for exclusive prefetch of a cache line from memory, the apparatus comprising:
   translation logic, configured to translate an extended prefetch instruction into a micro instruction sequence that directs a microprocessor to prefetch a cache line in an exclusive state, wherein said extended prefetch instruction is encoded to direct said microprocessor to prefetch said cache line in said exclusive state; and
   execution logic, coupled to said translation logic, configured to receive said micro instruction sequence, and configured to issue a transaction over a memory bus that requests said cache line in said exclusive state, wherein said cache line comprising a data entity that is to be subsequently modified, and wherein prefetching said cache line in said exclusive state occurs in parallel with execution of program instructions prior to execution of a subsequent store instruction that directs said microprocessor to modify said data entity.

2. The microprocessor apparatus as recited in claim 1, wherein prefetching said cache line in said exclusive state precludes a program delay corresponding to execution of said subsequent store instruction, and wherein said program delay is associated with bus transactions that must be issued to raise the state of said cache line from a shared state to said exclusive state.

3. The microprocessor apparatus as recited in claim 1, wherein said extended prefetch instruction comprises a modification to an existing prefetch instruction within an existing instruction set, and wherein said existing prefetch instruction does not otherwise provide for prefetch of said cache line in said exclusive state.

4. The microprocessor apparatus as recited in claim 3, wherein said existing instruction set comprises the x86 instruction set and wherein said existing prefetch instruction comprises the x86 prefetch instruction.

5. The microprocessor apparatus as recited in claim 3, wherein said extended prefetch instruction comprises a prefetch opcode field within an extended address specifier entity, and wherein a specific value of said prefetch opcode field directs said microprocessor to prefetch said cache line in said exclusive state, and wherein other values of said prefetch opcode field direct said microprocessor to execute other types of prefetch operations according to said existing instruction set.

6. The microprocessor apparatus as recited in claim 5, wherein said prefetch opcode field comprises bits 5:3 within the ModR/M byte of an x86 prefetch instruction.

7. The microprocessor apparatus as recited in claim 1, wherein, responsive to said micro instruction sequence, said execution logic directs a bus unit to issue said transaction over said memory bus.

8. The microprocessor apparatus as recited in claim 7, wherein said transaction comprises a data read and invalidate transaction that requests exclusive ownership of said cache line.

9. The microprocessor apparatus as recited in claim 8, wherein said memory bus conforms to the x86 architecture.

10. A microprocessor for performing a prefetch with intent to store operation, comprising:
    an extended prefetch instruction, configured to direct the microprocessor to prefetch a cache line in an exclusive state, wherein said extended prefetch instruction is encoded to direct the microprocessor to prefetch said cache line in said exclusive slate; and
    a translator, configured to receive said extended prefetch instruction, and configured to translate said extended prefetch instruction into associated micro instructions, wherein said associated micro instructions direct execution logic within the microprocessor to issue a bus transaction over a memory bus that requests exclusive ownership of said cache line, wherein said cache line comprises a data entity that is to be subsequently modified, and wherein prefetching said cache line in said exclusive state occurs in parallel with execution of instructions to execution of subsequent store instruction that directs the microprocessor to modify said data entity.

11. The microprocessor as recited in claim 10, wherein said extended prefetch instruction comprises a modification to an existing prefetch instruction within an existing instruction set, and wherein said existing prefetch instruction does not otherwise provide for prefetch of said cache line in said exclusive state.

12. The microprocessor as recited in claim 11, wherein said existing instruction set comprises the x86 instruction set and wherein said existing prefetch instruction comprises the x86 prefetch instruction.

13. The microprocessor as recited in claim 11, wherein said extended prefetch instruction comprises a prefetch opcode field within an extended address specifier entity, and wherein a specific value of said prefetch opcode field directs the microprocessor to prefetch said cache line in said exclusive state, and wherein other values of said prefetch opcode field direct the microprocessor to execute other types of prefetch operations according to said existing instruction set.

14. The microprocessor as recited in claim 13, wherein said prefetch opcode field comprises bits 5:3 of an ModR/M byte within an x86 prefetch instruction.

15. The microprocessor as recited in claim 10, wherein, responsive to said associated micro instructions, said execution logic directs a bus unit to issue said bus transaction over said memory bus.

16. The microprocessor as recited in claim 15, wherein said bus transaction is a data read and invalidate transaction that requests exclusive ownership of said cache line.

17. The microprocessor as recited in claim 16, wherein said memory bus conforms to the x86 architecture.

18. A method for prefetching a cache line in an exclusive state, comprising:
   retrieving an extended prefetch macro instruction, wherein the extended prefetch instruction is encoded to direct a microprocessor to prefetch the cache line in the exclusive state;
   translating the extended prefetch macro instruction into a micro instruction sequence, the micro instruction sequence directing the microprocessor to prefetch the cache line in the exclusive state; and
   responsive to the micro instruction sequence, issuing a bus transaction over a memory bus to read the cache line in the exclusive state, wherein said issuing comprises:
      allowing the microprocessor to execute following instructions in parallel with said issuing.

19. The method as recited in claim 18, wherein said retrieving comprises:
   providing the extended prefetch instruction as a modification of an existing prefetch instruction within an existing instruction set, wherein the existing prefetch instruction does not otherwise provide for prefetch of the cache line in the exclusive state.

20. The method as recited in claim 19, wherein said providing comprises:
   modifying an x86 prefetch instruction to enable specification of a prefetch with intent to store operation.

21. The method as recited in claim 19, wherein the extended prefetch instruction comprises a prefetch opcode field within an extended address specifier entity, and wherein a specific value of the prefetch opcode field directs the microprocessor to prefetch the cache line in the exclusive state, and wherein other values of the prefetch opcode field direct the microprocessor to execute other types of prefetch operations according to the existing instruction set.

22. The method as recited in claim 21, wherein the prefetch opcode field comprises bits 5:3 of an x86 ModR/M byte within an x86 prefetch instruction.

23. The method as recited in claim 18, wherein said issuing comprises:
   providing a data read and invalidate transaction over the memory bus that requests exclusive ownership of the cache line.

* * * * *